J. R. FRENCH.
ENGINE PISTON RING.
APPLICATION FILED MAY 5, 1917.

1,251,212.

Patented Dec. 25, 1917.

Inventor
JAMES R. FRENCH
By Watson E. Coleman
Attorney

UNITED STATES PATENT OFFICE.

JAMES R. FRENCH, OF LOMAX, ILLINOIS, ASSIGNOR OF ONE-HALF TO EARL G. CARTER, OF DALLAS CITY, ILLINOIS.

ENGINE-PISTON RING.

1,251,212.  Specification of Letters Patent.  Patented Dec. 25, 1917.

Application filed May 5, 1917. Serial No. 166,669.

*To all whom it may concern:*

Be it known that I, JAMES R. FRENCH, a citizen of the United States, residing at Lomax, in the county of Henderson and State of Illinois, have invented certain new and useful Improvements in Engine-Piston Rings, of which the following is a specification, reference being had to the accompanying drawings.

This invention relates to improvements in engine piston rings and has for its primary object to provide a very simple and efficient device for use in connection with the ordinary form of engine piston, whereby the passage of the gases between the periphery of the piston and the cylinder wall will be effectually prevented.

It is another and more particular object of the invention to provide a supplementary, continuous ring of flexible or ductile metal surrounding the ordinary split metal ring arranged in the groove of the piston body contiguous to the head thereof, said continuous ring, when subjected to the pressure of the exploded gas, being urged into tight frictional engagement with the cylinder wall.

It is a further general object of my invention to provide a device for the above purpose which may be very cheaply manufactured and can be easily applied to the ordinary piston without necessitating any changes whatever in the construction thereof.

Figure 1:
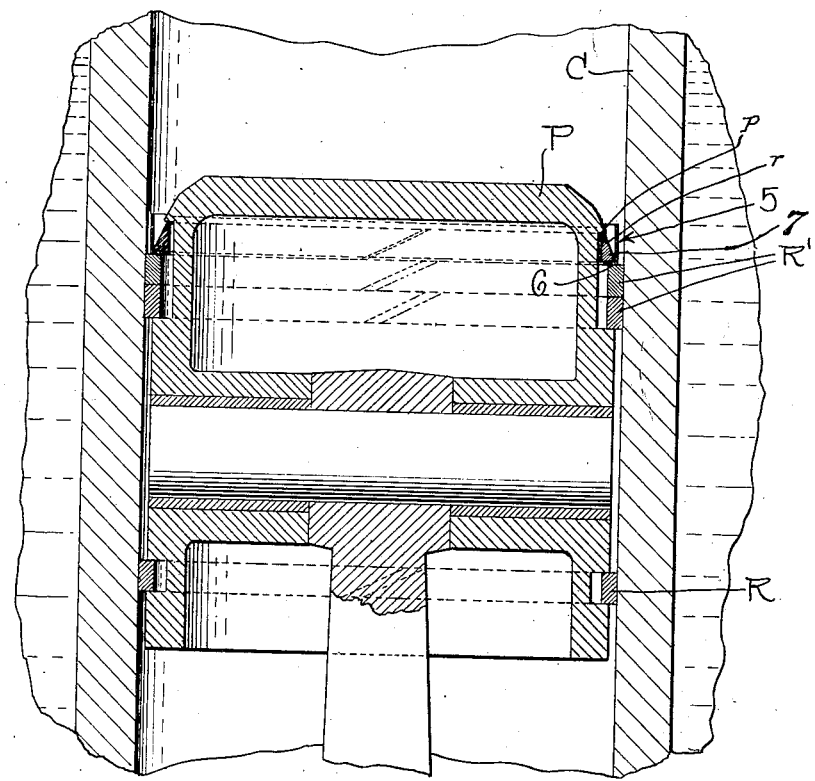
Figure 2:

With the above and other objects in view, my invention consists in the novel features of construction, combination, and arrangement of parts to be hereinafter more fully described, claimed, and illustrated in the accompanying drawing, in which, Figure 1 is a vertical sectional view through an engine piston showing the preferred embodiment of my invention applied thereto;

Fig. 2 is a detail perspective view of a flexible metal ring.

Referring in detail to the drawing, P designates the piston body operating in the chamber of the engine cylinder indicated at C. This piston body is provided in its periphery, in spaced relation to its lower end, with the usual groove to receive an expansible ring R, and adjacent the upper or head end of the piston upon which the exploded gas immediately impinges, the piston body is provided in its periphery with a relatively wide groove to receive a series of expansible rings R'. These rings may be of any ordinary or approved construction, as the present invention does not in any way relate to the specific construction either of the piston body or the expansible rings.

5 designates a continuous ring of sheet copper which is of sufficient thinness to render the same ductile or flexible. The ring 5 is formed with an inwardly projecting, continuous, annular flange 6. In the application of this ring, the two lower rings R' are first seated in the groove of the piston body and a third ring 7 is arranged within the ring 5 upon the flange 6. This ring is then expanded and forced downwardly over the head end of the piston so that it will seat in the piston groove, the flange 6 being disposed between this ring 7 and the next adjacent ring R'. It will be observed that the expansible ring 7 disposed within the sheet metal ring 5, is provided with an outer beveled or inclined face $r$, the thin edge of said ring being disposed beneath the annular shoulder $p$ on the piston P. Normally, the annular body wall of the sheet metal ring 5 is slightly spaced from the wall of the cylinder so that it will not be subjected to excessive wear in the reciprocating movement of the piston. It will be observed from reference to Fig. 1, that the upper edge of the continuous copper ring 5 projects above the upper face of the ring 7, thus providing an annular channel between the ring 5 and the head of the piston.

In the operation, when the explosion occurs in the combustion chamber of the cylinder, the gas exerts an outward pressure against the ring 5, and as this ring is of thin, ductile or flexible sheet copper, it will be expanded or forced outwardly into tight frictional engagement against the cylinder wall. The pressure will also act against the inclined face $r$ of the split ring 7 and force the ends of this ring together, contracting the ring against the periphery of the piston and effectually preventing the travel of the gases around the piston ring. Thus, all possibility of any portion of the exploded charge finding its way between the cylinder wall and the periphery of the piston is obviated, and the full force of the explosion is exerted directly against the head of the piston. It will thus be seen that I have provided a very serviceable and efficient device for the purpose stated and one which may be manufactured at small cost and readily applied to the ordinary piston ring without necessitating any changes whatsoever in the construction of the ring or the piston. My improved auxiliary ring may be readily removed when worn out and replaced by a new one.

From the foregoing description, taken in connection with the accompanying drawing, the construction, manner of use and several advantages of the device will be clearly and fully understood. The ring 5 may, of course, be made of any desired diameter, and while I have herein referred to the use of sheet copper in the construction of said ring, other flexible or ductile metals may be used in lieu thereof. It is, therefore, to be understood that while I have herein shown and described the preferred form and construction of my device, the same is nevertheless, susceptible of considerable modification, and I, therefore, reserve the privilege of adopting all such legitimate changes as may be fairly embodied within the spirit and scope of the invention as claimed.

Having thus fully described my invention, what I desire to claim and secure by Letters Patent is:

1. The combination with a piston body having a peripheral groove and an expansible ring seated therein, of a continuous ring of relatively thin ductile sheet metal having an annular wall spaced from the outer face of the expansible ring, said continuous ring also having an inwardly projecting annular flange disposed over one face of the piston ring.

2. The combination with an engine piston having an annular groove in its periphery and a plurality of expansible metal rings seated in said groove, the ring nearest the end of the piston having its outer face beveled, of a continuous ring of relatively thin ductile sheet metal surrounding the latter piston ring and having an annular wall spaced from the beveled face thereof, and means on one edge of said annular wall projecting inwardly between said piston ring and the next adjacent piston ring.

3. The combination with a piston ring having a peripheral groove and an expansible ring seated therein, said ring having a beveled outer face, of a continuous ring of relatively thin, ductile, sheet metal surrounding said expansible ring and having an inwardly projecting, annular flange extending over the wider end face of the piston ring, said sheet metal ring being of a width appreciably greater than the width of the piston ring.

In testimony whereof I hereunto affix my signature in the presence of two witnesses.

JAMES R. FRENCH.

Witnesses:
S. G. Rowe,
E. L. Lynn.